(12) United States Patent
Hwang et al.

(10) Patent No.: US 8,047,487 B2
(45) Date of Patent: Nov. 1, 2011

(54) DISPLAY APPARATUS HAVING ADJUSTABLE SUPPORTING UNIT

(75) Inventors: Kwang-sung Hwang, Suwon-si (KR); Byung-jo Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1935 days.

(21) Appl. No.: 11/119,966

(22) Filed: May 3, 2005

(65) Prior Publication Data

US 2005/0258334 A1 Nov. 24, 2005

(30) Foreign Application Priority Data

May 4, 2004 (KR) .......................... 10-2004-0031425

(51) Int. Cl.
*E04G 3/00* (2006.01)
(52) U.S. Cl. .................. 248/284.1; 248/458; 248/157; 248/370; 248/278.1; 248/349.1; 248/917; 248/919; 248/920; 248/921; 248/922; 361/679.06; 361/679.21; 361/679.22
(58) Field of Classification Search ................ 248/458, 248/284.1, 157, 370, 278.1, 349.1, 917, 919, 248/920, 921, 922
See application file for complete search history.

(56) References Cited

U.S. PATENT DOCUMENTS

| | | | |
|---|---|---|---|
| 2,890,010 A | 6/1959 | Barkheimer | |
| 4,365,561 A | 12/1982 | Tellier et al. | |
| 4,395,010 A | 7/1983 | Helgeland et al. | |
| 4,552,418 A | 11/1985 | Sarnezki et al. | |
| 4,605,188 A | 8/1986 | Goetz | |
| 4,611,777 A | 9/1986 | Ireland et al. | |
| 4,616,218 A | 10/1986 | Bailey et al. | |
| 4,684,089 A | 8/1987 | van der Lely | |
| 4,690,362 A | 9/1987 | Helgeland | |
| 4,733,838 A | 3/1988 | van der Lely | |
| 5,114,109 A | 5/1992 | Fitz et al. | |
| 5,124,805 A | 6/1992 | Chung et al. | |

(Continued)

FOREIGN PATENT DOCUMENTS

CN 2411511 Y 12/2000

(Continued)

OTHER PUBLICATIONS

Chinese Office Action on Dec. 14, 2007 issued in CN 200510066891.1.

(Continued)

*Primary Examiner* — Nkeisha Smith
(74) *Attorney, Agent, or Firm* — Stanzione & Kim, LLP

(57) ABSTRACT

A display apparatus including a display main body displaying a picture, and a base supporting the display main body about an installation surface. The display apparatus further includes a tilting unit provided between the display main body and the base and allowing the display main body to be tilted about the base; a pivoting unit provided between the display main body and the tilting unit and allowing the display main body to be pivoted about the base; a lifting unit provided between the tilting unit and the base and allowing the display main body to move up and down about the base; and a swiveling unit coupled to the base and allowing the display main body to be swiveled about the installation surface. With this configuration, the present invention provides a display apparatus of which a display main body not only rotates about a base in various directions, but also moves up and down about the base.

29 Claims, 14 Drawing Sheets

U.S. PATENT DOCUMENTS

| | | | |
|---|---|---|---|
| 5,128,662 A | 7/1992 | Failla | |
| 5,179,447 A | 1/1993 | Lain | |
| 5,229,920 A | 7/1993 | Spaniol et al. | |
| 5,279,488 A | 1/1994 | Fleming | |
| 5,283,595 A | 2/1994 | Krukovsky | |
| 5,373,333 A | 12/1994 | Kawada et al. | |
| 5,729,429 A | 3/1998 | Margaritis et al. | |
| 6,064,373 A | 5/2000 | Ditzik | |
| 6,326,955 B1 | 12/2001 | Ditzik | |
| 6,510,049 B2* | 1/2003 | Rosen | 361/681 |
| 6,822,857 B2* | 11/2004 | Jung et al. | 361/681 |
| 6,874,738 B2* | 4/2005 | Ishizaki et al. | 248/176.3 |
| 6,918,564 B2* | 7/2005 | Yen et al. | 248/404 |
| 6,921,057 B2* | 7/2005 | Chen et al. | 248/349.1 |
| 6,966,532 B2* | 11/2005 | Ishizaki et al. | 248/274.1 |
| 7,036,787 B1* | 5/2006 | Lin | 248/676 |
| 7,088,577 B2* | 8/2006 | Lauffer et al. | 361/683 |
| 7,099,150 B2* | 8/2006 | Lee | 361/683 |
| 7,159,828 B1* | 1/2007 | Yau et al. | 248/125.8 |
| 7,193,843 B2* | 3/2007 | Hsu | 361/681 |
| 7,213,792 B2* | 5/2007 | Choi | 248/279.1 |
| 7,232,098 B2* | 6/2007 | Rawlings et al. | 248/121 |
| 7,237,755 B2* | 7/2007 | Cho et al. | 248/274.1 |
| 7,274,555 B2* | 9/2007 | Kim et al. | 361/681 |
| 7,303,174 B2* | 12/2007 | Li | 248/346.06 |
| 7,331,551 B2* | 2/2008 | Oddsen, Jr. | 248/279.1 |
| 7,336,478 B2* | 2/2008 | Jang | 361/681 |
| 7,374,139 B2* | 5/2008 | Tsai et al. | 248/161 |
| 7,391,606 B2* | 6/2008 | Chen et al. | 361/681 |
| 7,413,150 B1* | 8/2008 | Hsu | 248/123.11 |
| 7,490,796 B2* | 2/2009 | Kim | 248/157 |
| 7,494,104 B2* | 2/2009 | Baek | 248/372.1 |
| 2001/0017761 A1 | 8/2001 | Ditzik | |
| 2003/0080949 A1 | 5/2003 | Ditzik | |
| 2006/0011788 A1* | 1/2006 | Jang | 248/132 |
| 2006/0219849 A1* | 10/2006 | Chiu | 248/125.8 |
| 2007/0045488 A1* | 3/2007 | Shin | 248/176.1 |
| 2007/0064379 A1* | 3/2007 | Shin | 361/681 |
| 2007/0195495 A1* | 8/2007 | Kim et al. | 361/681 |
| 2007/0215762 A1* | 9/2007 | Lee et al. | 248/125.7 |
| 2007/0262210 A1* | 11/2007 | Oh et al. | 248/125.1 |

FOREIGN PATENT DOCUMENTS

| | | |
|---|---|---|
| CN | 1414782 | 4/2003 |
| CN | 2594930 Y | 12/2003 |
| JP | 61-99873 | 6/1986 |
| JP | 61-99874 | 6/1986 |
| JP | 61-196314 | 8/1986 |
| JP | 62-96681 | 6/1987 |
| JP | 62-96682 | 6/1987 |
| JP | 62-239677 | 10/1987 |
| JP | 2-58783 | 4/1990 |
| JP | 2-215408 | 8/1990 |
| JP | 3-2381 | 1/1991 |
| JP | 3-29800 | 3/1991 |
| JP | 3-113423 | 11/1991 |
| JP | 3-114875 | 11/1991 |
| JP | 4-33073 | 3/1992 |
| JP | 4-81182 | 7/1992 |
| JP | 5-36423 | 5/1993 |
| JP | 5-188865 | 7/1993 |
| JP | 5-66715 | 9/1993 |
| JP | 6-4778 | 1/1994 |
| JP | 6-118880 | 4/1994 |
| JP | 2003-263116 | 9/2003 |
| JP | 2003-298248 | 10/2003 |
| JP | 20003-298248 | 10/2003 |
| KR | 20-295994 | 11/2002 |
| KR | 2003-20121 | 3/2003 |
| KR | 20-310878 | 4/2003 |
| KR | 2003-30721 | 4/2003 |
| KR | 2003-33662 | 5/2003 |
| KR | 2003-46900 | 6/2003 |
| KR | 2004-13886 | 2/2004 |

OTHER PUBLICATIONS

Chinese Office Action dated Feb. 2, 2007 issued in CN 200510066891.1.

Korean Office Action issued Dec. 6, 2005 in Korean Patent Application No. 2004-31425.

* cited by examiner

FIG. 6

DISPLAY APPARATUS HAVING ADJUSTABLE SUPPORTING UNIT

CROSS-REFERENCE TO RELATED APPLICATIONS

This application claims the benefit of Korean Patent Application No. 2004-31425, filed on May 4, 2004, in the Korean Intellectual Property Office, the disclosure of which is incorporated herein by reference.

BACKGROUND OF THE INVENTION

1. Field of the Invention

The present general inventive concept relates to a display apparatus, and more particularly, to a display apparatus having an improved structure convenient for a user.

2. Description of the Related Art

Generally, a display apparatus comprises a display main body displaying a picture, and a base seated on an installation surface, such as a table, and supporting the display main body. Here, the display apparatus includes all apparatuses which can display a picture, like a television, a monitor for a computer, etc.

Recently, the display main body comprises a thin display panel, such as a liquid crystal display (LCD), a plasma display panel (PDP), etc.

FIG. 1 is a perspective view of a conventional display apparatus. As shown therein, a conventional display apparatus 101 comprises a base 120 seated on an installation surface, such as a table, and supporting the display main body, a display main body 110 supported by the base 120 and displaying a picture, and a tilting hinge 130 provided between the base 120 and the display main body 110 and allowing the display main body 110 to be tilted about the base 120.

The tilting hinge 130 comprises a pair of brackets 131 mounted to a back of the display main body 110, and a pair of hinge shafts 133 having a first end connected to each bracket 131 and a second end connected to an upper portion of the base 120.

The hinge shaft 133 is aligned with a right and left direction axis about a screen of the display main body 110, and rotatably connected to at least one of the bracket 131 and the upper portion of the base 120. Hence, the display main body 110 can be tilted with respect to the hinge shaft 133.

However, in the conventional display apparatus, the display main body is only tiltable about the base, that is, the display main body cannot move about the base in swiveling, pivoting, or lifting directions, wherein "swiveling" means that the display main body rotates about the base with respect to a vertical axis of the base, "pivoting" means that the display main body rotates about the base with respect to a horizontal direction axis of the base, and "lifting" means that the display main body moves up and down about the base. Thus, the conventional display apparatus cannot provide a user with various view angles of the display main body.

SUMMARY OF THE INVENTION

Accordingly, it is an aspect of the present general inventive concept to provide a display apparatus of which a display main body can not only rotate about a base in various directions, but can also move up and down about the base.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing a display apparatus comprising a display main body displaying a picture, and a base supporting the display main body about an installation surface, the display apparatus comprising: a tilting unit provided between the display main body and the base and allowing the display main body to be tilted about the base; a pivoting unit provided between the display main body and the tilting unit and allowing the display main body to be pivoted about the base; a lifting unit provided between the tilting unit and the base and allowing the display main body to move up and down about the base; and a swiveling unit coupled to the base and allowing the display main body to be swiveled about the installation surface.

According to an aspect of the present general inventive concept, the lifting unit may comprise a guide frame provided vertically about the base; a lifting member provided sildably about the guide frame and coupled to the display main body; and an elastic member provided between the guide frame and the lifting member and elastically biasing the lifting member upward about the guide frame.

According to an aspect of the present general inventive concept, the elastic member may comprise a spiral spring having one end connected to the guide frame, and the lifting member may comprise a spring guide to contact a wound portion of the spiral spring.

According to an aspect of the present general inventive concept, the lifting unit may further comprise an auxiliary guide member provided between the guide frame and the lifting member and guiding the lifting member.

According to an aspect of the present general inventive concept, the lifting unit may further comprise a stopper connecting the guide frame with the lifting member to hold the lifting member about the guide frame.

According to an aspect of the present general inventive concept, the display apparatus may further comprise a pair of frame supporters disposed between the guide frame and the base and having a triangle shape to support the guide frame about the base.

According to an aspect of the present general inventive concept, the tilting unit may comprise a first tilting bracket coupled to the lifting unit; a second tilting bracket coupled to the display main body; and a tilting shaft provided between the first and second tilting brackets and allowing the second tilting bracket to be tilted about the first tilting bracket.

According to an aspect of the present general inventive concept, the tilting unit may further comprise a spring coupled to the first and second tilting brackets.

According to an aspect of the present general inventive concept, the pivoting unit may comprise a pivoting shaft coupled to the tilting unit; and a pivoting bracket having a first side coupled to the display main body and a second side pivotally coupled to the pivoting shaft.

According to an aspect of the present general inventive concept, the pivoting unit may further comprise a pivoting angle restrictor to restrict a pivoting angle of the pivoting bracket about the tilting unit.

According to an aspect of the present general inventive concept, the swiveling unit may comprise a swiveling member coupled to the base; and a swiveling supporter having a first side supported on the installation surface and a second side sildably provided between the swiveling member and the base to support the swiveling member to be swiveled.

According to an aspect of the present general inventive concept, the display apparatus may further comprise a cover provided between the display main body and the base and forming an outer appearance; and a cable holder coupled to at least one of the display main body, the cover and the base, and supporting a cable connected to at least one of the display main body and the base.

According to an aspect of the present general inventive concept, the cable holder may comprise a cable ring having an annular shape to hold the cable, and a holder coupling portion extended from the cable ring and detachably coupled to at least one of the display main body, the cover and the base.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 6 is an exploded perspective view of a lifting unit provided in the display apparatus of FIG. 3;

DETAILED DESCRIPTION OF THE PREFERRED EMBODIMENTS

Figure 1:
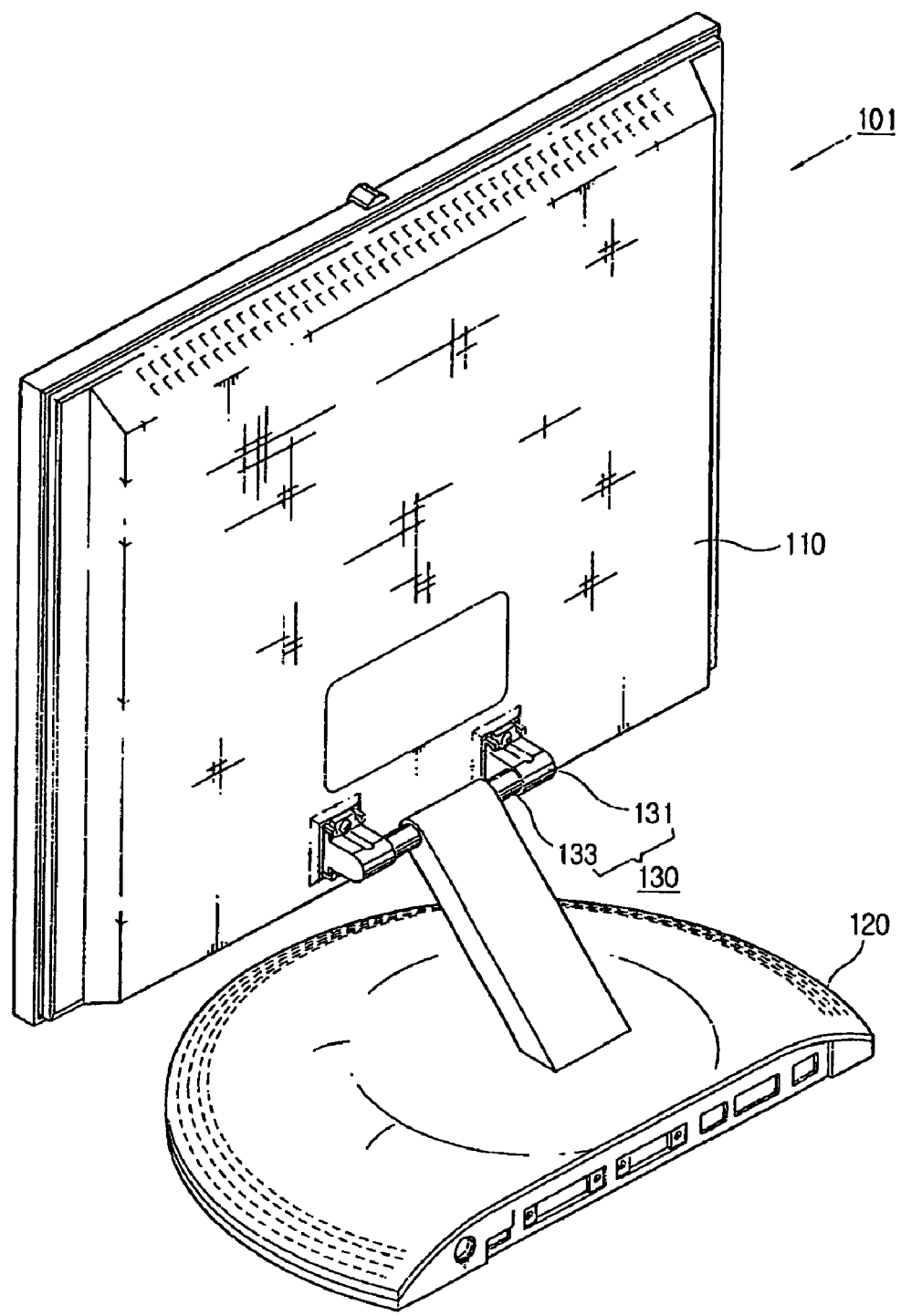
FIG. 1 is a rear perspective view of a conventional display apparatus.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As shown in FIGS. 2 through 7, a display apparatus 1 according to an embodiment of the present general inventive concept comprises a display main body 10 displaying a picture, a base 20 seated on a predetermined installation surface and supporting the display main body 10, and a tilting unit 30 (see, for example, FIG. 4) provided between the display main body 10 and the base 20 and allowing the display main body 10 to be tilted about the base 20. Further, the display apparatus 1 comprises a pivoting unit 40 (see, for example, FIG. 5) provided between the display main body 10 and the tilting unit 30 and allowing the display main body 10 to be pivoted about the base 20. Further, the display apparatus 1 comprises a lifting unit 60 (see, for example, FIG. 6) provided between the display main body 10 and the base 20 and allowing the display main body 10 to move up and down about the base 20.

Figure 14:
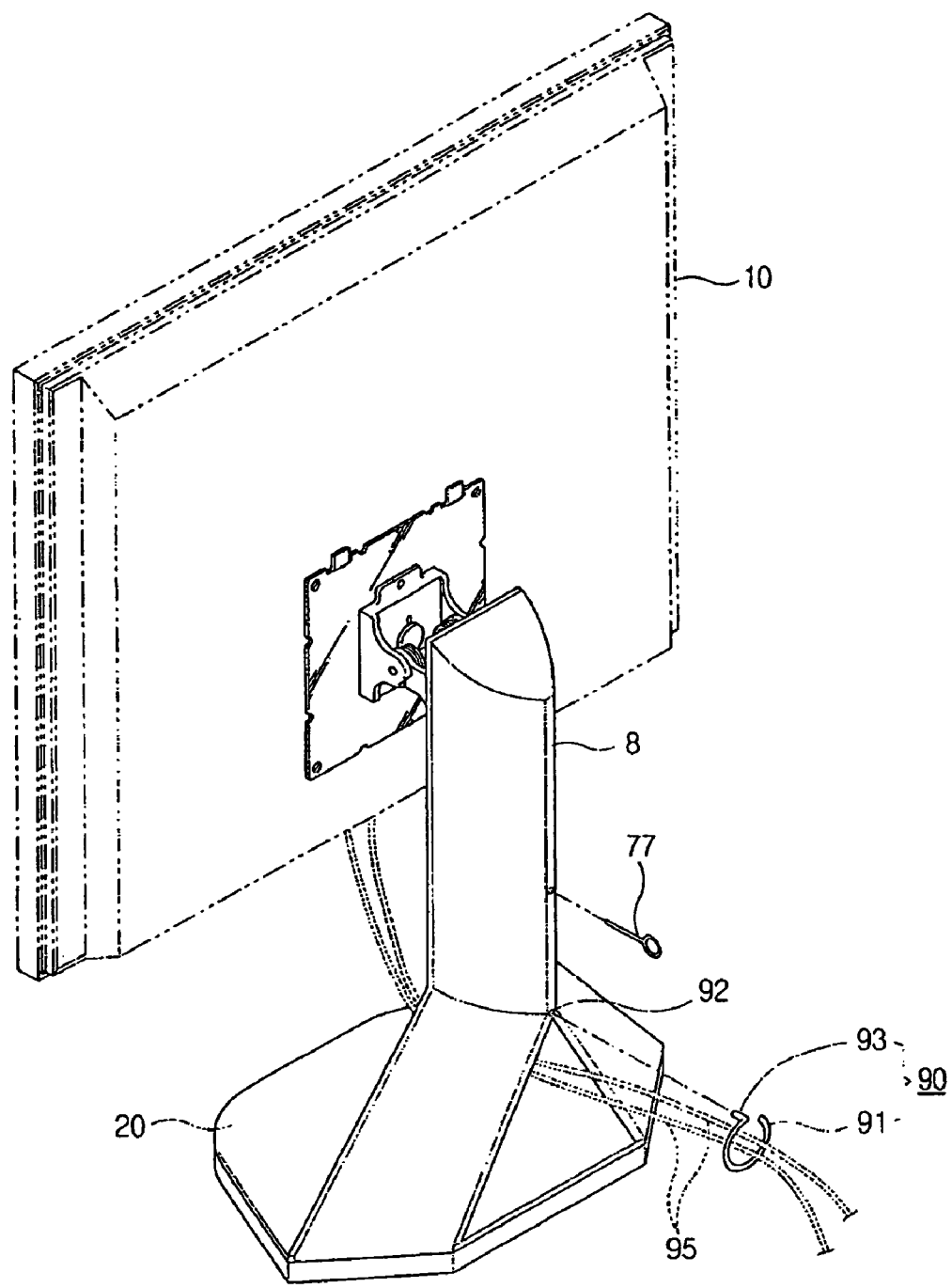
FIG. 14 is an exploded perspective view of a cable holder provided in the display apparatus according to an embodiment of the present general inventive concept.

Further, the display apparatus 1 comprises a swiveling unit 80 (see, for example, FIG. 7) coupled to the base 20 and allowing the display main body 10 to be swiveled about the installation surface. The display apparatus 1 may comprise a front cover 5 in a front portion of the forgoing units provided between the display main body 10 and the base 20, and a rear cover 8 in a rear portion of the forgoing units. Referring to FIG. 14, the display apparatus 1 may further comprise a cable holder 90 holding a cable 95 connected to at least one of the display main body 10 and the base 20.

Figure 2:
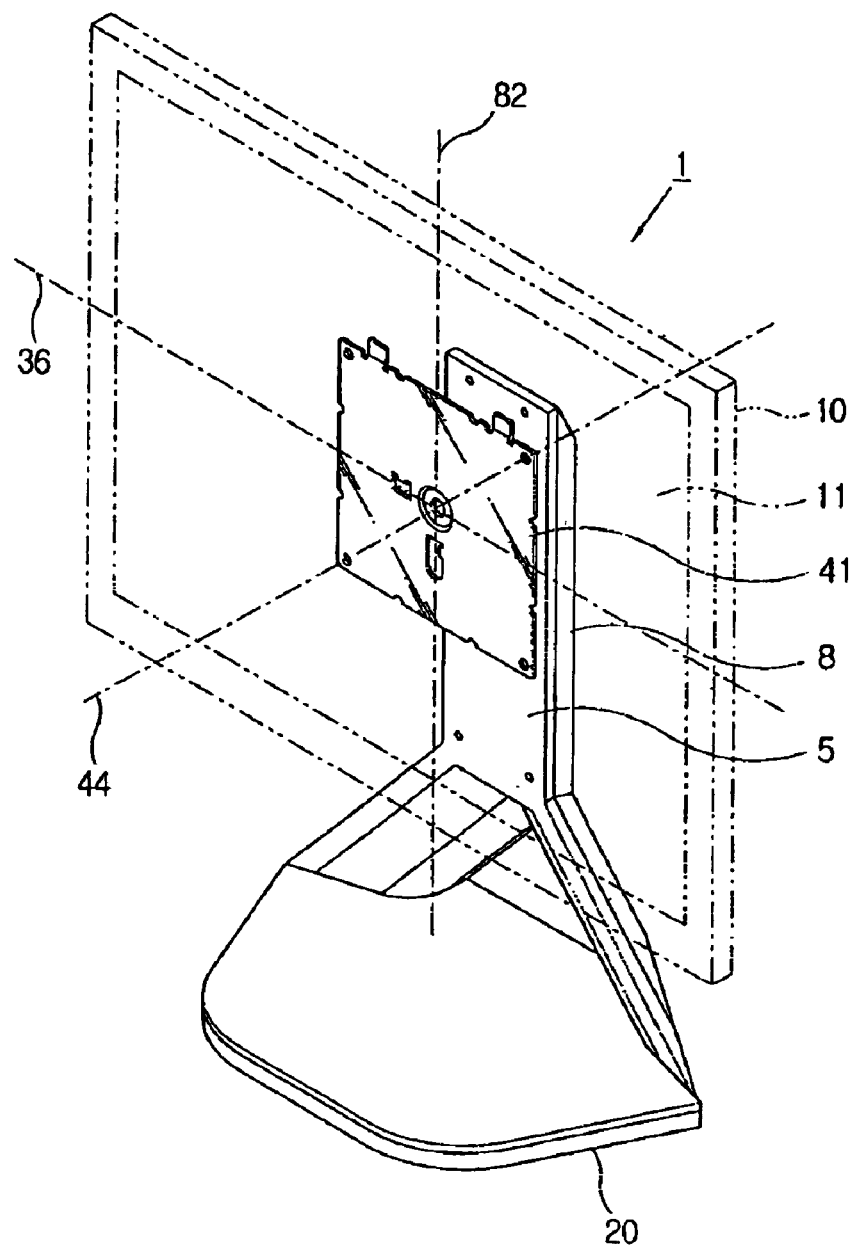
FIG. 2 is a perspective view of a display apparatus according to an embodiment of the present general inventive concept.
Figure 5:
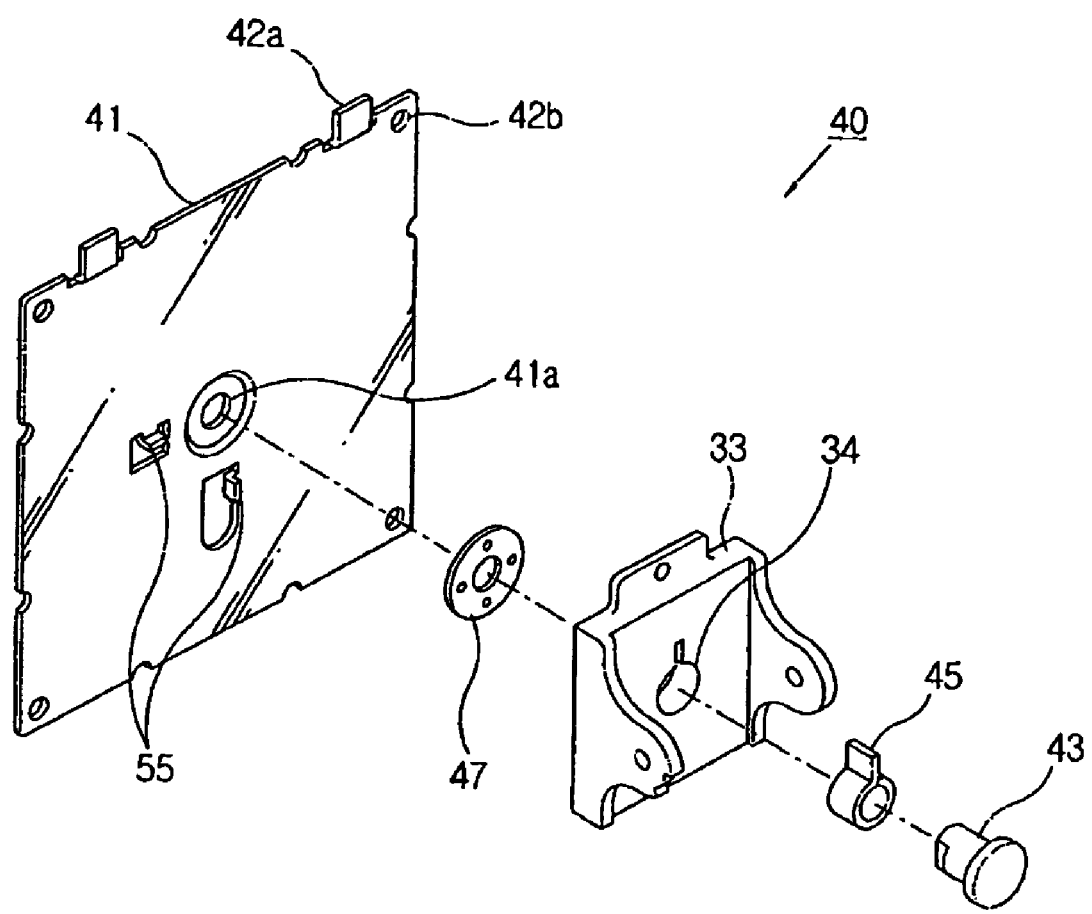
FIG. 5 is an exploded perspective view of a pivoting unit provided in the display apparatus of FIG. 3.

Referring to FIGS. 2 and 5, the display main body 10 may comprise a display panel 11 having a thin shape, like an LCD or a PDP, to display a picture. Further, the display main body 10 can be formed with a plurality of screw holes (not shown) on the back thereof to be coupled with projections 42a and coupling holes 42b of a pivoting bracket 41 (to be described later). Here, the coupling holes 42b of the pivoting bracket 41 and the screw holes of the display main body 10 are formed on the basis of a video electronics standard association (VESA) standard. Alternatively, an arm stand (not shown) depending on the VESA standard may be coupled to the screw hole(s) of the display main body 10.

Figure 3:
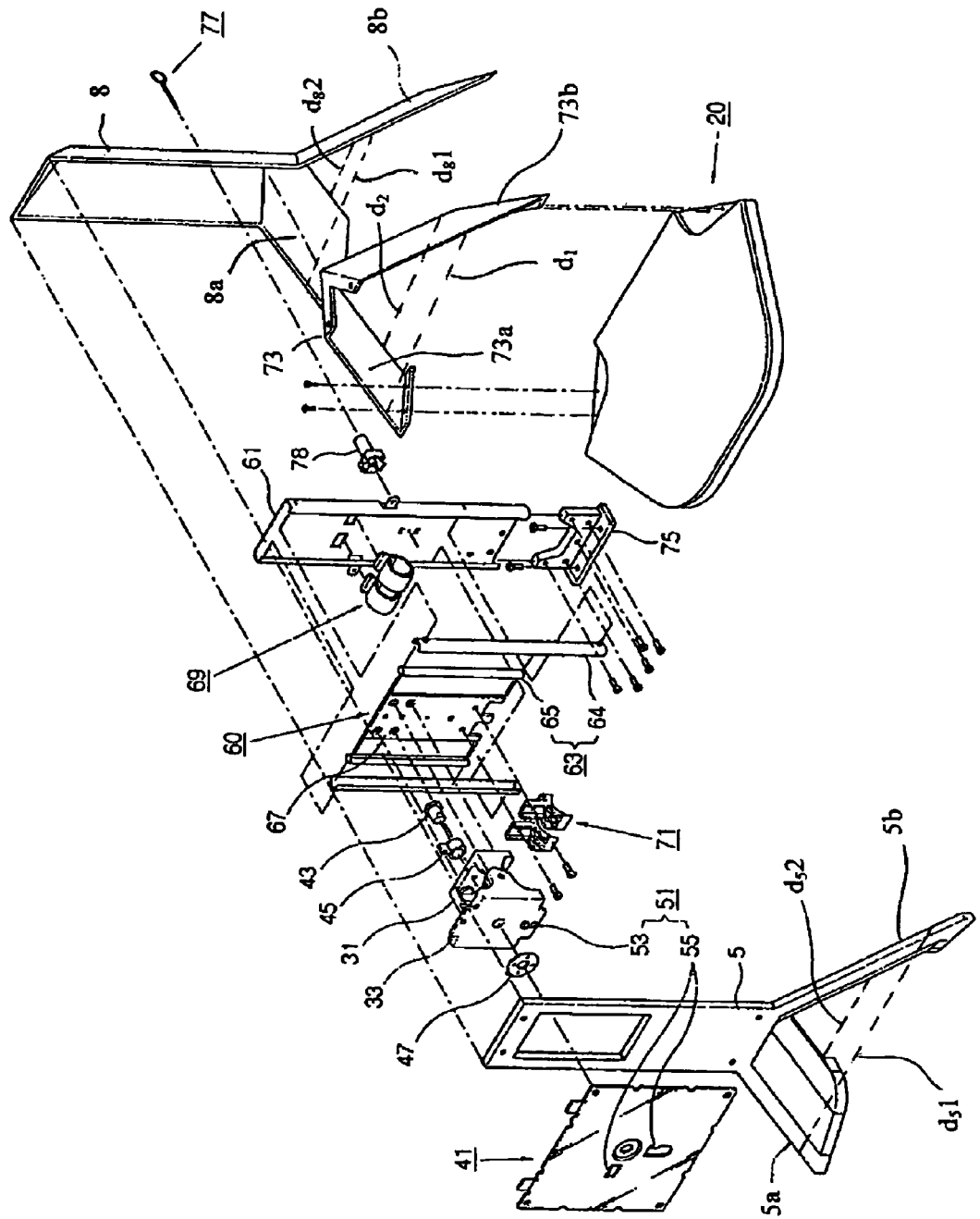
FIG. 3 is an exploded perspective view of the display apparatus of FIG. 2.
Figure 7:
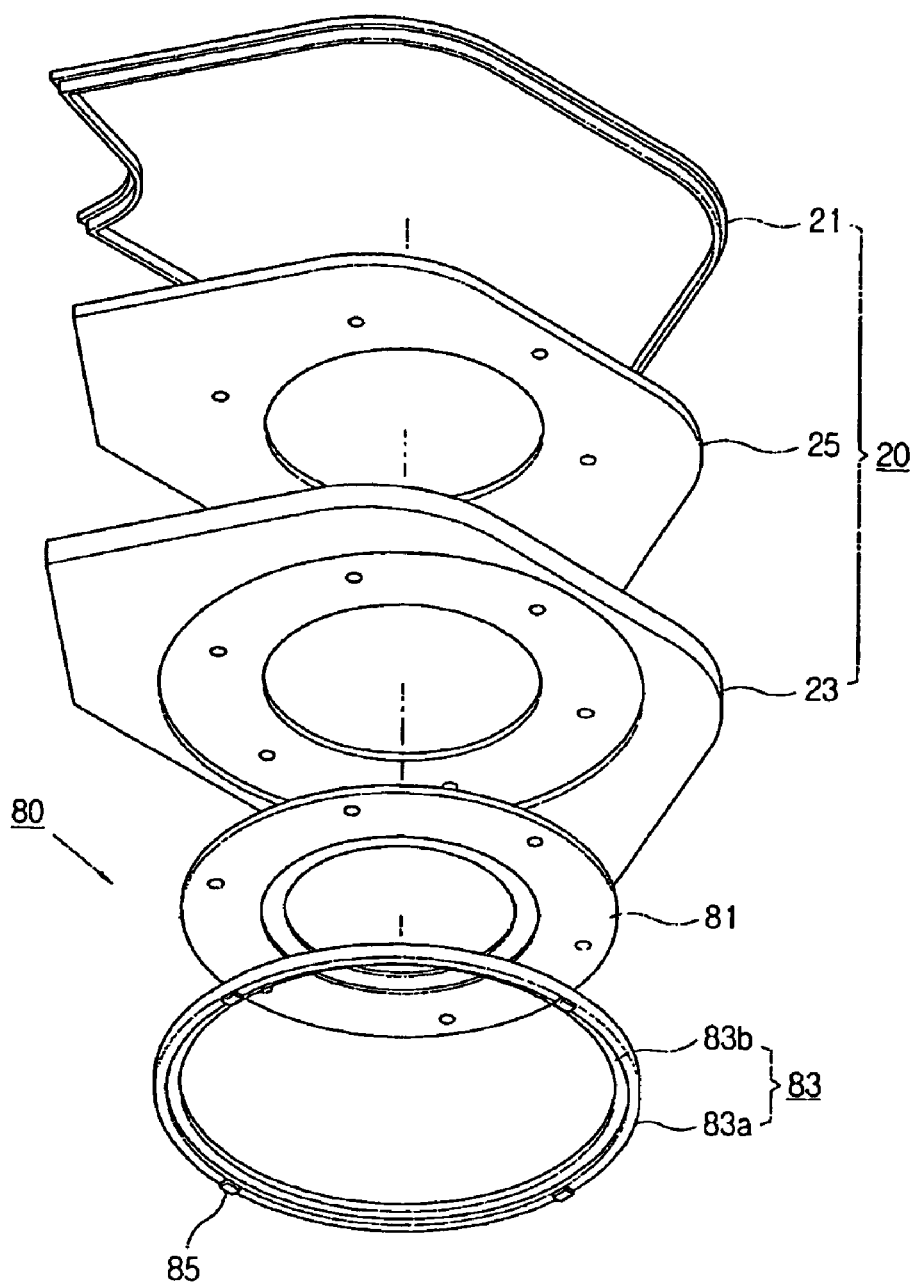
FIG. 7 is an exploded perspective view of a swiveling unit provided in the display apparatus of FIG. 3.

Referring to FIGS. 3 and 7, the base 20 is shaped like a plate to be seated on a predetermined installation surface. Further, the base 20 comprises a base frame 25 coupled to a guide frame 61 of the lifting unit 60 (to be described later) and supporting the lifting unit 60, an upper base cover 21 provided in an upper portion of the base frame 25, and a lower base cover 23 provided in a lower portion of the base frame 25.

The base frame 25 is shaped like a plate and made of a material having enough rigidity to withstand the weight of the display main body, e.g., preferably made of metal. The upper and lower base covers 21 and 23 may be formed of molding plastics, but are not limited thereto, and may be made of various other materials, e.g., aluminum to beautify an outer appearance of the base 20. Here, the base frame 25, the upper base cover 21, and the lower base cover 23 can be coupled by a screw or the like. On the other hand, the installation surface on which the base 20 is seated may include a horizontal surface such as a table. However, the installation surface may alternatively include an inclined surface such as a wall.

As illustrated in FIG. 3, the tilting unit 30 is provided between the lifting unit 60 and the pivoting unit 40 and allows the display main body 10 to be tilted about the base 20, that is, to rotate with respect to a right and left direction axis 36 (see FIG. 2) about the screen of the display main body 10.

Figure 4:
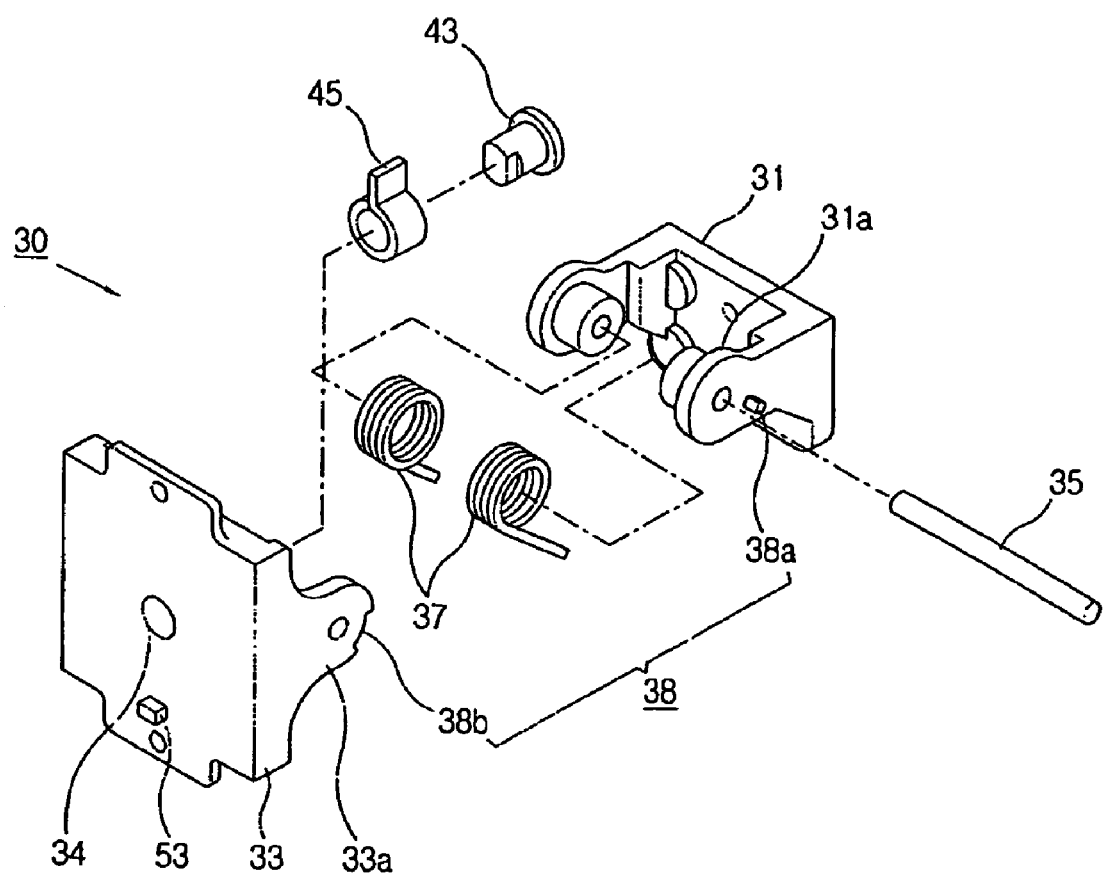
FIG. 4 is an exploded perspective view of a tilting unit provided in the display apparatus of FIG. 3.

Referring to FIGS. 3 and 4, the tilting unit 30 may comprise a first tilting bracket 31 coupled to the lifting unit 60, a second tilting bracket 33 coupled to the display main body 10, and a tilting shaft 35 connecting the first tilting bracket 31 with the second tilting bracket 33 and allowing the second tilting bracket 33 to be tiltable about the first tilting bracket 31. The tilting unit 30 may further comprise a spring 37 coupled to the first and second tilting brackets 31 and 33. Further, the tilting unit 30 may comprise a tilting angle restrictor 38 provided in the first and second tilting brackets 31 and 33 and restricting a tilting angle of the second tilting bracket 33.

The first tilting bracket 31 can be shaped like a plate and coupled to a lifting member 67 of the lifting unit 60 (to be described later), thereby sliding with the lifting member 67. Further, the first tilting bracket 31 may comprise a first tilting shaft connecting portion 31a protruding from a surface thereof toward the second tilting bracket 33 to be coupled to the tilting shaft 35.

The second tilting bracket 33 can be shaped like a plate and can be formed with a first pivoting shaft connecting portion 34 to be coupled with a pivoting shaft 43 of the pivoting unit

40 (to be described later). Further, the second tilting bracket 33 may comprise a second tilting shaft connecting portion 33a protruding from a surface thereof toward the first tilting bracket 31 to be coupled to the tilting shaft 35.

The tilting shaft 35 is inserted in both the first tilting shaft connecting portion 31a of the first tilting bracket 31 and the second tilting shaft connecting portion 33a of the second tilting bracket 33, thereby allowing the second tilting bracket 33 to be tiltable about the first tilting bracket 31. Further, the tilting shaft 35 is press-fitted in both the first and second tilting shaft connecting portions 31a and 33a, respectively, to generate a predetermined friction when the second tilting bracket 33 is tilted about the first tilting bracket 31. Preferably, such friction is an amount such that it can be readily overcome by a force applied by a user.

The spring preferably includes a torsion coil spring 37 having a first end coupled to the first tilting bracket 31 and a second end coupled to the second tilting bracket 33. The torsion coil spring 37 is disposed to elastically restore the second tilting bracket 33 toward a forward tilting direction about the first tilting bracket 31. That is, the torsion coil spring 37 prevents the second tilting bracket 33 coupled to the display main body 10 from being backward tilted due to the display main body's own weight. Further, the resilience of the torsion coil spring 37 is an amount such that the second tilting bracket 33 is prevented from being backward tilted due to the display main body's own weight. Thus, a user can easily tilt the display main body 10 forward regardless of the display main body's own weight, and can also tilt the display main body 10 backward with the same force.

The tilting angle restrictor 38 may comprise a tilting projection 38a provided in one of the first tilting shaft connecting portion 31a of the first tilting bracket 31 and the second tilting shaft connecting portion 33a of the second tilting bracket 33, and a tilting projection groove 38b provided in the other one of the first tilting shaft connecting portion 31a and the second tilting shaft connecting portion 33a and accommodating the tilting projection 38a so as to restrict the tilting angle of the tilting projection 38a within a predetermined tilting angle.

The tilting projection 38a may protrude from a surface of the first tilting shaft connecting portion 31a in a direction parallel with the tilting shaft 35. The tilting projection groove 38b is cut from the second tilting shaft connecting portion 33a by an arc shape having a predetermined angle and accommodates the tilting projection 38a therein, so that the tilting angle of the tilting projection groove 38b is restricted by the tilting projection 38a.

The pivoting unit 40 is provided between the display main body 10 and the tilting unit 30 and allows the display main body 10 to be pivoted about the base 20, that is, to rotate with respect to a back and forth direction axis 44 (refer to FIG. 2). Further, the pivoting unit 40 may comprise the pivoting shaft 43 coupled to the tilting unit 30, and the pivoting bracket 41 having a first side coupled to the display main body 10 and a second side rotatably coupled to the pivoting shaft 43. The pivoting unit 40 may further comprise a pivoting angle restrictor 51 (see, for example, FIG. 3) restricting a pivoting angle of the pivoting bracket 41 about the tilting unit 30.

Referring to FIG. 5, the pivoting shaft 43 has a first end fitted in the first pivoting shaft connecting portion 34 provided in the second tilting bracket 33 of the tilting unit 30, and a second end rotatably connected to the pivoting bracket 41. That is, the pivoting shaft 43 has the first end inserted in and coupled to the first pivoting shaft connecting portion 34 penetratingly formed on the second tilting bracket 33, and the second end rotatably inserted in the second pivoting shaft connecting portion 41a penetratingly formed on the pivoting bracket 41. Here, the pivoting shaft 43 has a first edge having a diameter larger than that of the pivoting shaft 43 itself, and a second edge passing through the second pivoting shaft connection portion 41a and then bent outwardly. Further, the pivoting unit 40 may comprise at least one washer 47 put on the pivoting shaft 43 and disposed between the second tilting bracket 33 and the pivoting bracket 41. Additionally, the pivoting unit 40 may comprise a pivoting curl 45 disposed between the pivoting shaft and the first pivoting shaft connection portion 34 and generating a predetermined friction therebetween.

According to an aspect of the present general inventive concept, the number of washers 47 may be four, but is not limited thereto, and may be three or less, or five or more. Further, the washer 47 may include a disc spring providing resilience between the second tilting bracket 33 and the pivoting bracket 41 to generate a predetermined friction when the pivoting bracket 41 is pivoted about the second tilting bracket 33. Here, the friction due to the washer 47 is of an amount sufficient to be easily overcome by a user when a user pivots the display main body 10.

The pivoting bracket 41 can be shaped like a plate and formed with the second pivoting shaft connecting portion 41a at the center thereof. Further, the pivoting bracket 41 may comprise a plurality of projections 42a and a plurality of coupling holes 42b to be coupled with the back of the display main body 10.

The projections 42a protrude as a pair from an upper portion of the pivoting bracket 41 and are inserted in and coupled with the back of the display main body 10. Further, four coupling holes 42b are formed on the pivoting bracket 41 and coupled with the screw holes (not shown) formed in the back of the display main body 10.

The pivoting angle restrictor 51 restricts the pivoting angle when the pivoting bracket 41 coupled with the display main body 10 is pivoted about the second tilting bracket 33. Here, the pivoting angle restrictor 51 comprises a projection stopper 53 protruding from the second tilting bracket 33 toward the pivoting bracket 41, and a pair of pivoting projections 55 protruding from the pivoting bracket 41 toward the second tilting bracket 33, leaving the projection stopper 53 therebetween. Preferably, an angle between the pair of pivoting projections 55 is about 90°, allowing the display main body 10 to be pivoted within a range from 0° to 90°, but is not limited thereto, and may be 180°, allowing the display main body 10 to be pivoted within a range from 0° to 180°. Thus, the display main body 10 is pivotable about the base 20 within a predetermined angle range.

Figure 6:
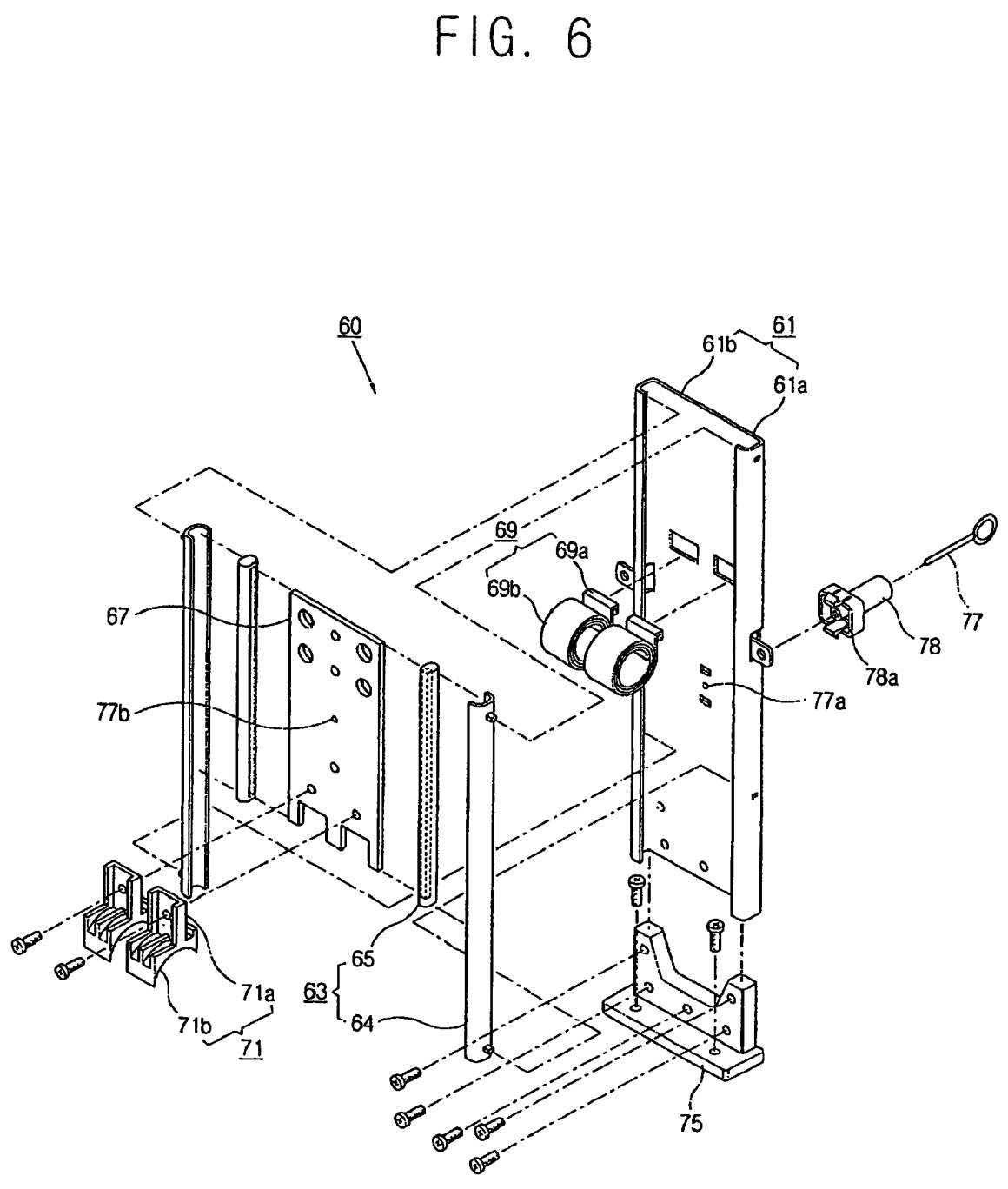

Referring to FIGS. 3 and 6, the lifting unit 60 is provided between the base 20 and the tilting unit 30 and allows the display main body 10 to slide up and down about the base 20. Further, the lifting unit 60 may comprise the guide frame 61 vertically provided about the base 20, the lifting member 67 coupled to the display main body 10 and slidingly provided about the base 20, and an elastic member provided between the guide frame 61 and the lifting member 67 and restoring the lifting member 67 upward about the guide frame 61. The lifting unit 60 may comprise a soft auxiliary guide member 63 provided between each guide portion 61a of the guide frame 61 and the lifting member 67 and guides the lifting member 67 to move up and down. Further, the lifting unit 60 comprises a stopper 77 connecting the guide frame 61 with the lifting member 67 to hold the lifting member 67 about the guide frame 61.

The guide frame 61 has a lower portion coupled to the base frame 25 and supports the lifting member 67 to slide up and down. The guide frame 61 may comprise a pair of guide portions 61a having a "U"-shape at opposite sides of the guide frame 61 and guiding the lifting member 67, and a plate portion 61b connecting the pair of guide portions 61a. The guide frame 61 may be made of metal to keep a predetermined rigidity. Preferably, a frame supporter 73, having a pair of frame supporting legs 73a and 73b forming a triangle shape, is disposed between the guide frame 61 and the base 20 and supports the guide frame 61 about the base 20. Further, a supporting bracket 75 may be provided between the guide frame 61 and the frame supporter 73 to enhance the connection between the guide frame 61 and the frame supporter 73.

The supporting bracket 75 has an upper portion protruding therefrom and inserted in a lower portion of the guide portion 61a of the guide frame 61 and then coupled with the lower portion of the guide portion 61a by a screw or the like, and a lower portion coupled to a top of the frame supporter 73, where the frame supporting legs 73a and 73b converge, by a screw or the like. Here, the supporting bracket 75 may be made of metal to keep a predetermined rigidity.

As described above, the frame supporter 73 has the top portion where the frame supporting legs 73a and 73b converge, which is coupled with the supporting bracket 75 by a screw or the like, and two lower portions branching out as the frame supporting legs 73a and 73b to form a predetermined angle with respect to each other, wherein each of the frame supporting legs 73a and 73b is coupled at their respective lower ends to a respective portion of the base frame 25 by a screw or the like. Further, the frame supporter 73 is preferably made of metal to keep a predetermined rigidity enough to support the guide frame 61. Thus, the frame supporter 73 is coupled with the guide frame 61 at the point at which the frame supporting legs 73a and 73b converge, and is coupled to the base 20 at the lower portions of each of the frame supporting legs 73a and 73b to form a triangle shape, thereby stably supporting the guide frame 61. In an aspect of the present general inventive concept, each of the frame supporting legs 73a and 73b is covered by a respective rear cover leg 8a/8b on a rear side thereof and a respective front cover legs 5a/5b on a front side thereof, wherein the rear cover legs 8a and 8b are provided at lower ends of the rear cover 8 and the front cover legs 5a and 5b are provided at lower ends of the front cover 5. As illustrated in FIG. 3, a distance d, between front portions of the frame supporting legs 73a and 73b is greater than a distance $d_2$ between rear portions of the frame supporting legs 73a and 73b such that the frame supporting legs 73a and 73b converged toward each other in an upward and forward direction to provide additional stability to the display main body 10 and the lifting unit 60 against tipping backwards in the event that a force is applied to the front of the display main body 10 or display panel 11.

The pair of front cover legs 5a and 5b form a triangular shape with respect to each other at a predetermined angle as they converge towards each other while projecting upwardly and away from the base 20, and the rear cover legs 8a and 8b also form a triangular shape with respect to each other at a predetermined angle as they converge towards each other while projecting upwardly and away from the base 20. Furthermore, as illustrated in FIG. 3, each of the rear cover legs 8a and 8b tilt forward such that a distance $d_s1$ between front portions of the front cover legs 5a and 5b is greater than a distance $d_s2$ between rear portions of the front cover legs 5a and 5b, and a distance $d_g1$ between front portions of the rear cover legs 8a and 8b is greater than a distance $d_g2$ between rear portions of the rear cover legs 8a and 8b. As a result, the front cover legs 5a and 5b and the rear cover legs 8a and 8b each tilt forward as they project upwardly and converge with one another to provide additional stability for the display main body 10 and the lifting unit 60 against tipping backwards in the event that a force is applied to the front of the display main body 10 or display panel 11.

The elastic member may include a spiral spring 69 having one end connected to the guide frame 61 and a wound portion in contact with the lifting member 67. However, the elastic member may include a coil spring, a flat spring, or a resilient material such as rubber.

The spiral spring 69 may comprise a connecting portion 69a bent and coupled to the plate portion 61b of the guide frame 61, and a wound portion 69b wound like a roll. The spiral spring 69 may form a pair of springs, but is not limited thereto, and may be a single spring, or three or more springs. Further, the lifting member 67 is provided with a spring guide 71 contacting the wound portion 69b and moving up and down with the resilience of the wound portion 69b. Preferably, the resilience of the wound portion 69b is of an amount such that the display main body 10 does not move downward by its own weight. That is, the resilience of the wound portion 69b is approximately equal to the weight of the display main body 10. Thus, a user can easily move up and down the display main body 10 with an approximately equivalent force regardless of the moving direction.

The spring guide 71 may comprise a guide coupling portion 71a coupled to the lifting member 67 by a screw or the like, and a spring contact portion 71b integrally formed with the guide coupling portion 71a and having an arc shape to contact the wound portion 69b. Thus, the spring guide 71 transfers the resilience of the wound portion 69b to the lifting member 67, and easily transfers a downward press of a user to the wound portion 69b.

The lifting member 67 is shaped like a plate and is slidably coupled to the guide frame 61 at opposite sides thereof. Further, the lifting member 67 comprises an upper portion connected with the first tilting bracket 31 by a screw or the like, and a lower portion connected with the guide coupling portion 71a of the spring guide 71 by a screw or the like. Thus, the lifting member 67 slides up and down when a user presses the display main body 10.

Each of the auxiliary guide members 63 is provided between the respective guide portion 61a of the guide frame 61 and the lifting member 67 and guides the lifting member 67 to smoothly slide. Further, each auxiliary guide member 63 comprises an auxiliary guide portion 64 coupled with the respective guide portion 61a, and a sliding portion 65 coupled to opposite sides of the lifting member 67 and slides about the respective auxiliary guide portion 64.

The auxiliary guide portion 64 is inserted in the respective guide portion 61a, kept stationary, and is recessed corresponding to the respective sliding portion 65. Accordingly, the sliding portion 65 forms a pair to be respectively connected to the opposite sides of the lifting member 67, is in contact with the respective auxiliary guide portion 64, and slides together with the lifting member 67. Further, each sliding portion 65 has a convex shape to be in contact with the respective auxiliary guide portion 64, and each auxiliary guide portion 64 has a concave shape to be in contact with the respective sliding portion 65 in correspondence to the sliding portion 65. Preferably, each auxiliary guide portion 64 and sliding portion 65 are made of a soft material to reduce friction therebetween and easily slides against each other. For example, each auxiliary guide portion 64 and sliding portion 65 are preferably made of acetal, but is not limited thereto, and may be made of plastics, rubber, etc.

The stopper 77 is connected to both the guide frame 61 and the lifting member 67, and prevents the lifting member 67 from moving about the guide frame 61. That is, the stopper 77 is shaped like a bar and is inserted in a first stopper coupling portion 77a formed on the guide frame 61 and a second stopper coupling portion 77b formed on the lifting member 67. The stopper 77 may be inserted in a forward direction from a back of the guide frame 61. Further, to easily insert the stopper 77 in the guide frame 61, the guide frame 61 may be formed with a stopper guide 78 at the back thereof.

The first stopper coupling portion 77a and the second stopper coupling portion 77b are penetratingly formed to communicate with each other while the lifting member 67 stays in the lower portion of the guide frame 61. Thus, the stopper 77 is inserted in both the first and second stopper coupling portions 77a and 77b, so that the lifting member 67 does not move about the guide frame 61 even when the display apparatus 1 is carried or the display main body 10 is separated from the display apparatus 1. At this time, a package volume thereof is also decreased.

The stopper guide 78 is mounted to the back of the guide frame 61 formed with the first stopper coupling portion 77a, and is formed with a through hole 78a accommodating the stopper 77 and communicates with the first stopper coupling portion 77a. Preferably, the stopper guide 78 is extended to approximately contact the rear cover 8. Further, the stopper guide 78 guides the stopper 77 to be easily connected to the first stopper coupling portion 77a when the stopper 77 is inserted from the rear cover 8 and to be easily connected with the second stopper coupling portion 77b of the lifting member 67 accordingly.

Referring to FIGS. 2 and 7, the swiveling unit 80 is provided in the lower portion of the base 20, and allows the display main body 10 to be swiveled about the base 20 with respect to a vertical axis 82 (refer to FIG. 2). The swiveling unit 80 comprises a swiveling member 81 coupled to the lower portion of the base 20, and a swiveling supporter 83 having a first side supported on the installation surface and a second side sildably provided between the swiveling member 81 and the base 20 and supporting the swiveling member 81 to be swiveled.

The swiveling member 81 is coupled to a bottom surface of the lower base cover 23 of the base 20 by a screw or the like, and is preferably shaped like a disc. Between the swiveling member 81 and the lower base cover 23 is formed a space to accommodate an upper supporter 83b of the swiveling supporter 83 (to be described later).

The swiveling supporter 83 comprises a lower supporter 83a seated on the installation surface such as a table, and the upper supporter 83b extends from an upper portion of the lower supporter 83a and is accommodated between the swiveling member 81 and the lower base cover 23. Further, the swiveling supporter 83 is preferably shaped like a ring. Additionally, a contact pad 85 is provided on the bottom of the lower supporter 83a so as to prevent noise and a skidding when it contacts the installation surface.

Thus, the swiveling member 81 coupled with the base 20 can be swiveled about the swiveling supporter 83.

Referring to FIG. 14, the cable holder 90 is coupled to at least one of the display main body 10, the front cover 5, the rear cover 8 and the base 20, and holds the cable 95 connected to at least one of the display main body 10 and the base 20. Here, the cable holder 90 comprises a cable ring 91 having an annular shape to hold the cable 95, a holder coupling portion 93 extending from the cable ring 91 and detachably coupled to at least one of the display main body 10, the front cover 5, the rear cover 8 and the base 20.

The cable ring 91 is preferably shaped like an opened ring to hold a plurality of cables 95. However, the cable ring 91 may have a polygonal shape or an elliptical shape to hold the plurality of cables 95. Thus, the cables 95 extending backward from the display apparatus 1 can be neatly arranged.

The holder coupling portion 93 preferably protrudes from the cable ring 91. Further, the rear cover 8 is formed with a holder coupling hole 92 into which the holder coupling portion 93 is fitted. Thus, the holder coupling portion 93 can be fitted into or separated from the holder coupling hole 92 as necessary.

With this configuration, the display apparatus operates as follows (refer to FIGS. 8 through 13).

Figure 8:
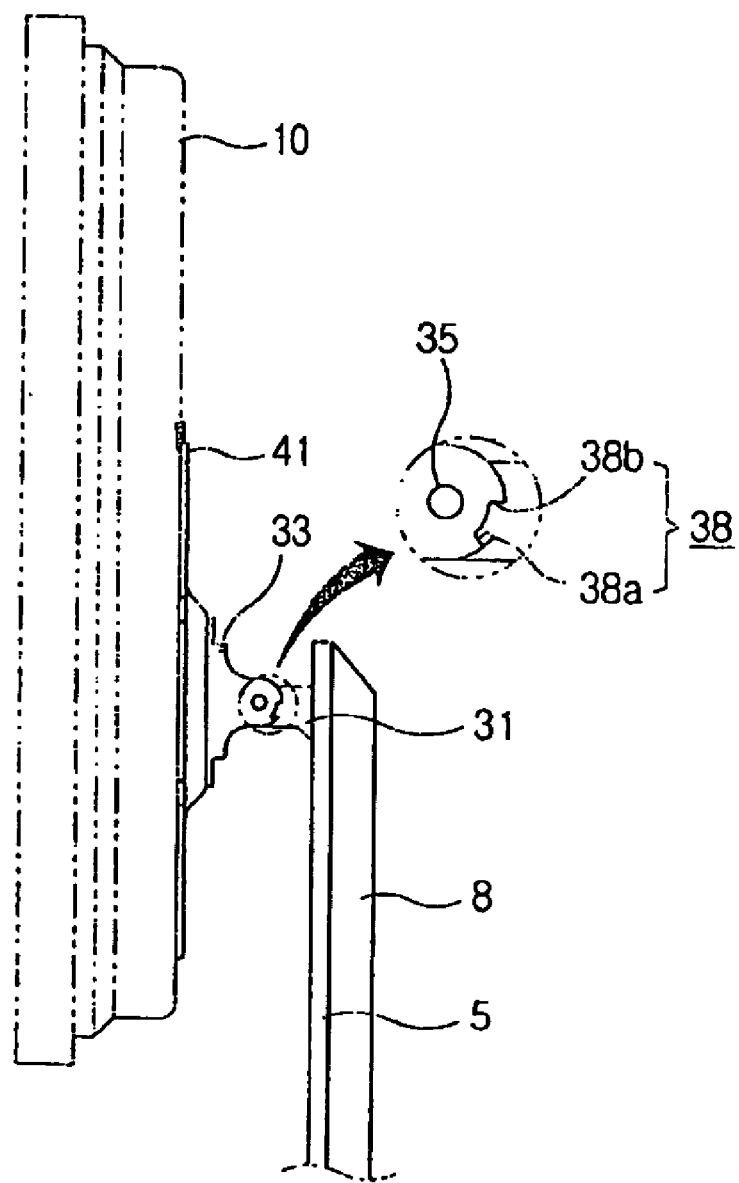
FIGS. 8 through 13 are views illustrating operations of the display apparatus according to an embodiment of the present general inventive concept.
Figure 9:
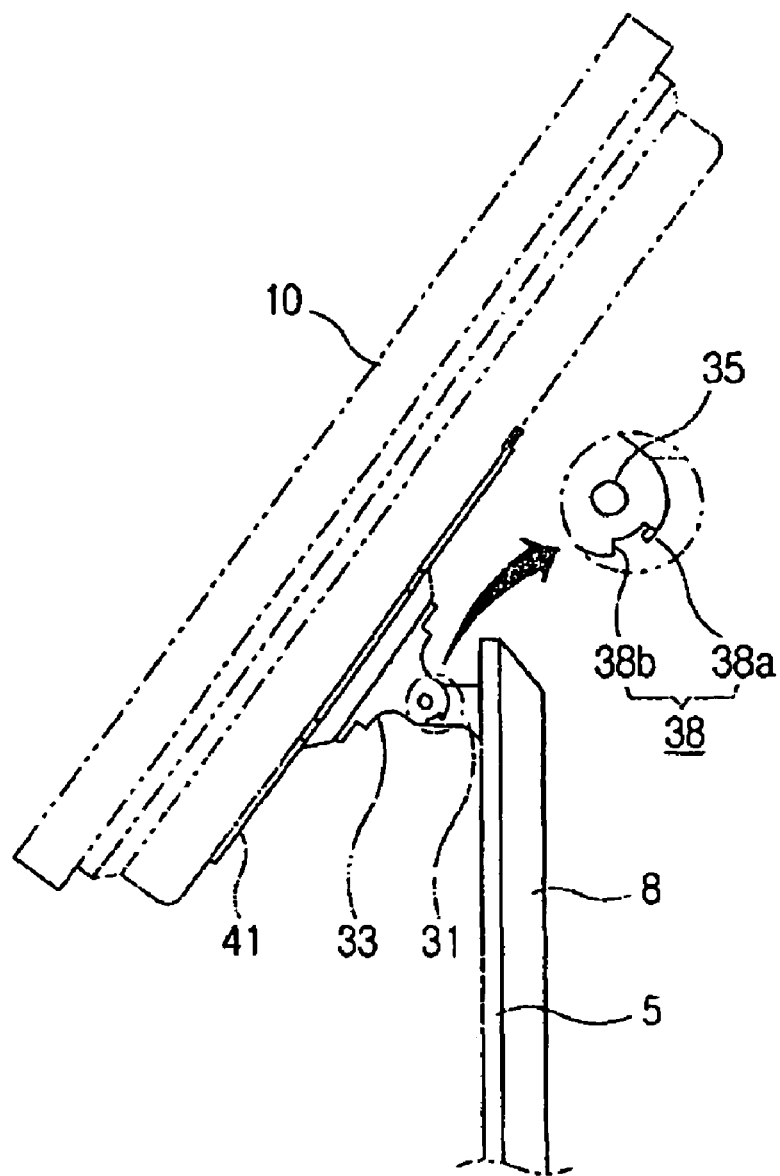

As shown in FIGS. 8 and 9, the display main body 10 can be titled about the base 20 as follows. First, when a user presses the display main body 10 forward and backward, the second tilting bracket 33 coupled to the display main body 10 is tilted forward and backward about the first tilting bracket 31 with respect to the tilting shaft 35. At this time, the resilience of the torsion coil spring 37 allows a user to easily tilt the display main body 10 forward with resistance regardless of the display main body's own weight. Also, a user can easily tilt the display main body 10 forward and backward with an approximately equivalent force regardless of the tilting direction. Here, the tilting angle of the display main body 10 is restricted within a predetermined angle by the tilting angle restrictor 38.

Figure 10:
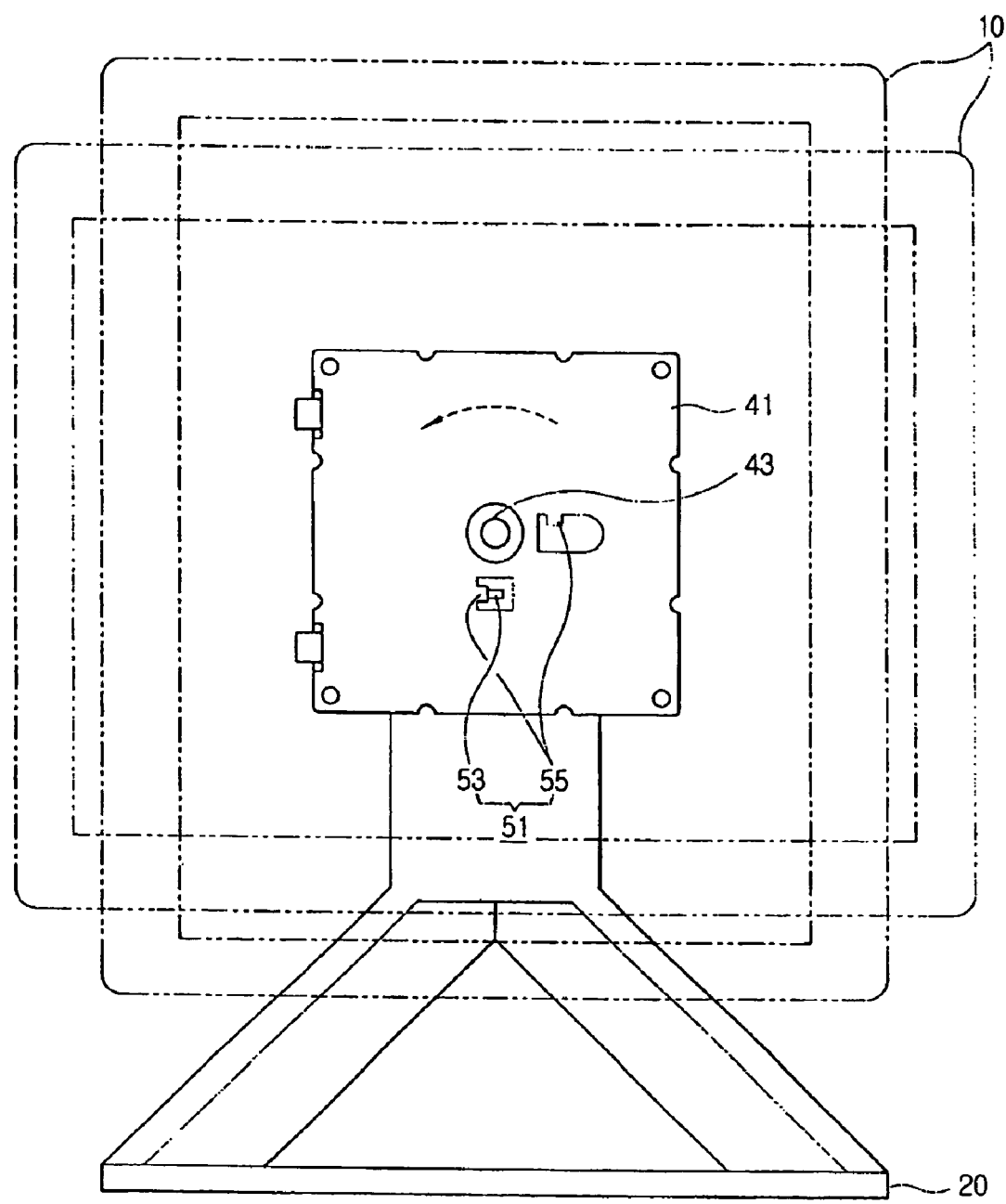

As shown in FIG. 10, the display main body 10 can be pivoted about the base 20 as follows. First, when a user rotates the display main body 10 with respect to the back and forth direction, the pivoting bracket 41, coupled to the display main body 10, is pivoted about the second tilting bracket 33 with respect to the pivoting shaft 43. At this time, a user just needs a force enough to overcome the resilience of the washer 47. Here, the pivoting angle of the display main body 10 is restricted within a predetermined angle by the pivoting angle restrictor 51.

Figure 11:
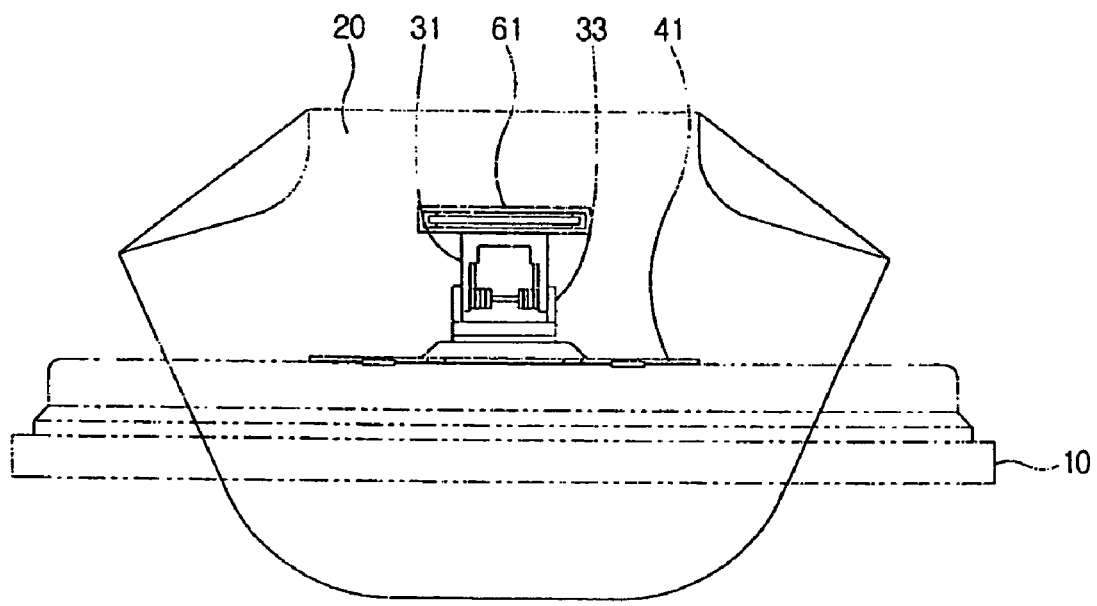
Figure 12:
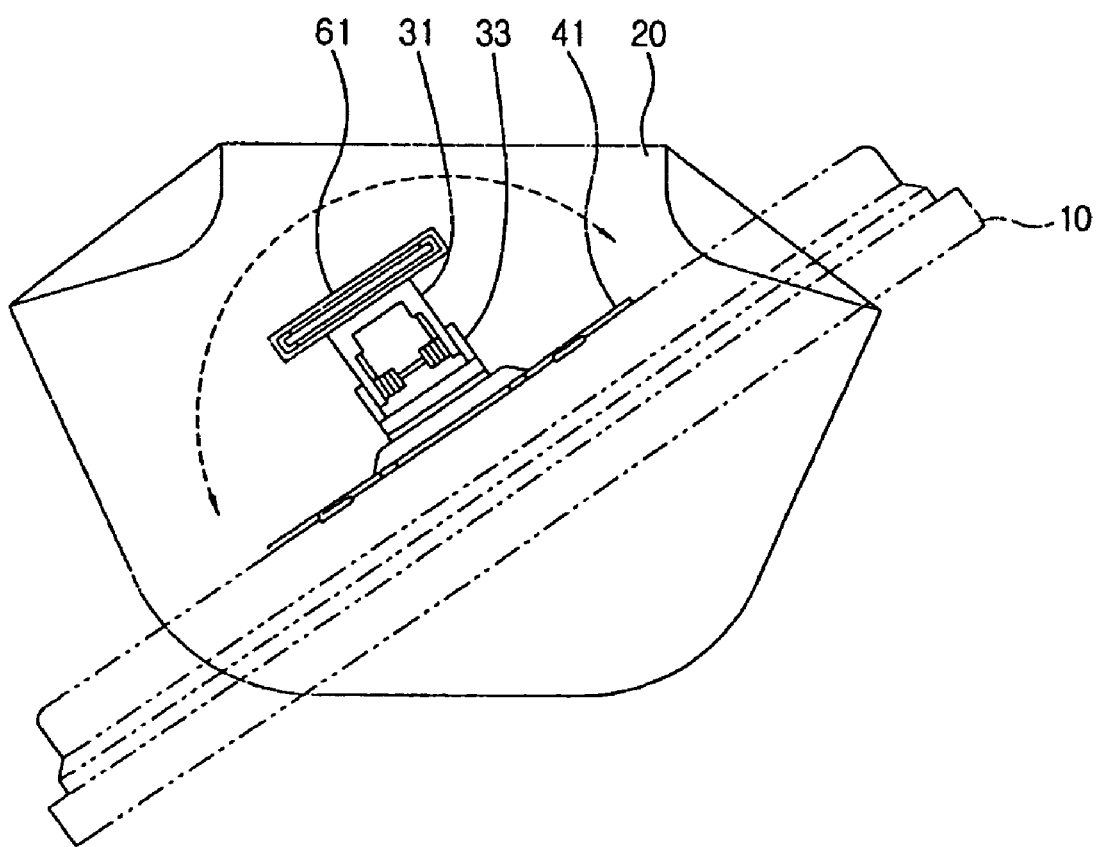

As shown in FIGS. 11 and 12, the display main body 10 can move up and down about the base 20 as follows. First, when a user moves the display main body 10 up and down, the lifting member 67, coupled to the display main body 10, slides up and down about the guide frame 61. At this time, the resilience of the spiral spring 69 allows a user to easily move the display main body 10 up and down with resistance regardless of the display main body's own weight. Also, a user can easily move up and down the display main body 10 with an approximately equivalent force regardless of the moving direction.

Figure 13:
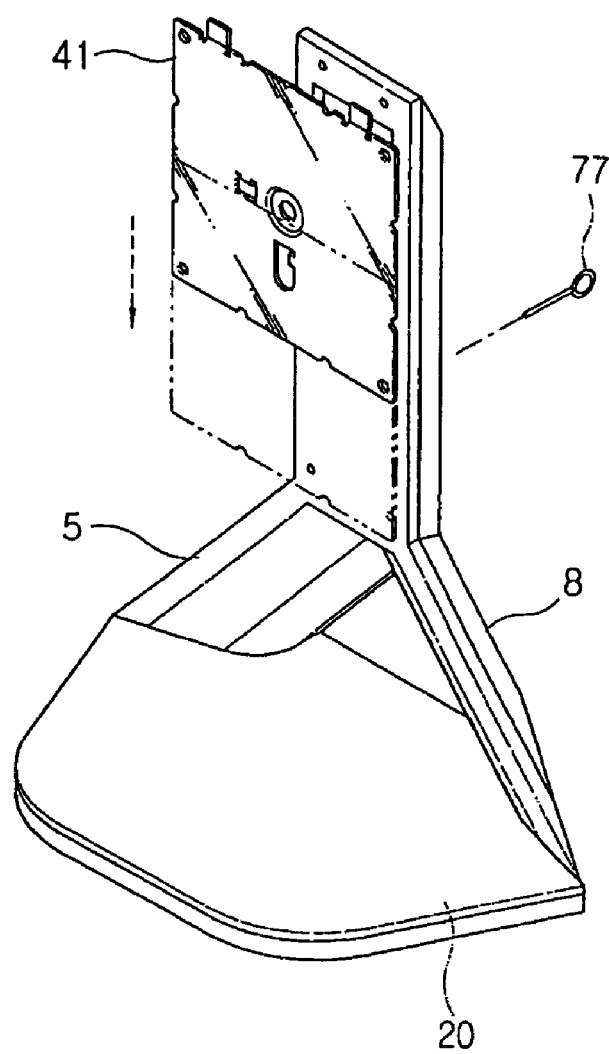

As shown in FIGS. 2, 7 and 13, the display main body 10 can be swiveled about the installation surface as follows. First, when a user rotates the display main body 10 or the base 20 with respect to the vertical axis 82, the swiveling member 81, coupled to the base 20, swivels with respect to the vertical axis 82 about the swiveling supporter 83 seated on the installation surface.

Thus, the display apparatus according to the present general inventive concept comprises the tilting unit, the pivoting unit, the lifting unit, and the swiveling unit, so that the display main body can not only rotate with respect to various directions about the base, but can also move up and down about the base.

As described above, the present general inventive concept provides a display apparatus of which a display main body can not only rotate with respect to various directions about a base, but can also move up and down about the base.

Further, the present general inventive concept provides a display apparatus with a stopper, so that it is convenient to carry the display apparatus and decreases a package volume thereof.

Still further, the present general inventive concept provides a display apparatus with a cable holder, so that cables extending backward from the display apparatus can be neatly arranged.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus comprising a display main body to display a picture, and a base to support the display main body about an installation surface, the display apparatus comprising:
   a tilting unit provided between the display main body and the base to allow the display main body to be tilted with respect to a horizontal axis of the base, the tilting unit having a tilting angle restrictor to restrict a tilting angle of the display main body;
   a pivoting unit provided between the display main body and the tilting unit to allow the display main body to be pivoted with respect to an axis perpendicular to the horizontal axis of the base;
   a lifting unit provided between the tilting unit and the base to allow the display main body to move up and down with respect to the base, the lifting unit comprising:
      a guide frame provided vertically with respect to the base and having a pair of guide portions formed in a U-shape at opposite sides thereof to guide movement of the display main body with respect to the base, and a plate portion to connect the pair of guide portions; and
      a lifting member with opposite sides provided slidably between the U-shape guide portions and coupled to the display main body;
   a soft auxiliary guide member provided between each U-shape guide portion and the lifting member to guide the lifting member to smoothly slide along the U-shape guide portions, wherein the soft auxiliary guide member comprises:
      an auxiliary guide portion coupled with each U-shape guide portion; and
      a sliding portion coupled to each of opposite sides of the lifting member to slide about a respective auxiliary guide portion;
   a frame supporter having a pair of frame supporting legs coupled between the display main body and the base to support the display main body; and
   a swiveling unit coupled to the base to allow the display main body to be swiveled with respect to the installation surface,
   wherein the pivoting unit further comprises a pivoting angle restrictor to restrict a pivoting angle of a pivoting bracket about the tilting unit.

2. The display apparatus according to claim 1, wherein the lifting unit further comprises:
   an elastic member provided between the guide frame and the lifting member and elastically biasing the lifting member upward about the guide frame.

3. The display apparatus according to claim 2, wherein the elastic member comprises a spiral spring having one end connected to the guide frame, and the lifting member comprises a spring guide to contact a wound portion of the spiral spring.

4. The display apparatus according to claim 2, wherein the lifting unit further comprises a stopper configured to connect with the guide frame and the lifting member to hold the lifting member about the guide frame.

5. The display apparatus according to claim 2, wherein the pair of frame supporting legs are disposed between the guide frame and the base and have a triangular shape to support the guide frame about the base.

6. The display apparatus according to claim 1, wherein the tilting unit further comprises:
   a first tilting bracket coupled to the lifting unit;
   a second tilting bracket coupled to the display main body; and
   a tilting shaft provided between the first and second tilting brackets to allow the second tilting bracket to be tilted about the first tilting bracket at a tilting angle.

7. The display apparatus according to claim 6, wherein the tilting unit further comprises a spring coupled to the first and second tilting brackets to elastically restore the second tilting bracket toward a forward tilting direction about the first tilting bracket.

8. The display apparatus according to claim 2, wherein the tilting unit further comprises:
   a first tilting bracket coupled to the lifting unit;
   a second tilting bracket coupled to the display main body; and
   a tilting shaft provided between the first and second tilting brackets to allow the second tilting bracket to be tilted about the first tilting bracket.

9. The display apparatus according to claim 8, wherein the tilting unit further comprises a spring coupled to the first and second tilting brackets to elastically restore the second tilting bracket toward a forward tilting direction about the first tilting bracket.

10. The display apparatus according to claim 1, wherein the pivoting unit further comprises:
    a pivoting shaft coupled to the tilting unit; and
    a pivoting bracket having a first side coupled to the display main body and a second side pivotally coupled to a pivoting shaft.

11. The display apparatus according to claim 2, wherein the pivoting unit further comprises:
    a pivoting shaft coupled to the tilting unit; and
    a pivoting bracket having a first side coupled to the display main body and a second side pivotally coupled to a pivoting shaft.

12. The display apparatus according to claim 1, wherein the swiveling unit comprises:
    a swiveling member coupled to the base; and
    a swiveling supporter having a first side supported on the installation surface and a second side sildably provided between the swiveling member and the base to support the swiveling member to be swiveled.

13. The display apparatus according to claim 2, wherein the swiveling unit comprises:
    a swiveling member coupled to the base; and
    a swiveling supporter having a first side supported on the installation surface and a second side sildably provided between the swiveling member and the base to support the swiveling member to be swiveled.

14. The display apparatus according to claim 1, further comprising a cover provided between the display main body and the base and forming an outer appearance; and
    a cable holder coupled to at least one of the display main body, the cover and the base, and supporting a cable connected to at least one of the display main body and the base.

15. The display apparatus according to claim 14, wherein the cable holder comprises:
  a cable ring having an annular shape to hold the cable; and
  a holder coupling portion to extend from the cable ring and to be detachably coupled to at least one of the display main body, the cover, and the base.

16. The display apparatus according to claim 7, wherein a tilting angle restrictor unit is provided in the first and second tilting brackets to restrict the tilting angle of the second tilting bracket.

17. The display apparatus according to claim 16, wherein the tilting angle restrictor unit comprises:
  a tilting projection provided in either one of a first tilting shaft connecting portion of the first tilting bracket or a second tilting shaft connecting portion of the second tilting bracket, and a tilting projection groove provided in another of one of the first tilting shaft connecting portions of the first tilting bracket or the second tilting shaft connecting portion of the second tilting bracket to accommodate a tilting projection so as to restrict the tilting angle of the tilting projection within the tilting angle of the display main body.

18. The display apparatus according to claim 6, wherein the second tilting bracket comprises a pivoting shaft connecting portion and the pivoting unit comprises a pivoting shaft to be coupled with the pivoting shaft connecting portion.

19. The display apparatus according to claim 8, wherein the pivoting unit further comprises:
  a pivoting shaft coupled to the tilting unit; and
  a pivoting bracket having a first side coupled to the display main body and a second side pivotally coupled to a pivoting shaft.

20. The display apparatus according to claim 1, wherein the pivoting angle restrictor comprises:
  a projection stopper which protrudes from a second tilting bracket toward the pivoting bracket; and
  a pair of pivoting projections which protrude from the pivoting bracket toward the second tilting bracket to dispose the projection stopper therebetween.

21. A display apparatus comprising:
  a display main body;
  a base;
  a lifting unit connected at a first end to the display main body and at a second end to the base to allow the display main body to move up and down with respect to the base, the lifting unit including:
    a guide frame provided vertically with respect to the base and having a pair of guide portions formed in a U-shape at opposite sides thereof to guide movement of the display main body with respect to the base, and a plate portion to connect the pair of guide portions;
    a lifting member with opposite sides provided slidably between the U-shape guide portions and coupled to the display main body;
    a soft auxiliary guide member provided between each U-shape guide portion and the lifting member to guide the lifting member to smoothly slide along the U-shape guide portions, wherein the soft auxiliary guide member comprises:
      an auxiliary guide portion coupled with each U-shape guide portion; and
      a sliding portion coupled to each of opposite sides of the lifting member to slide about a respective auxiliary guide portion; and
    an elastic member provided between the guide frame and the lifting member to elastically bias the lifting member upward about the guide frame;
  a frame supporter having a pair of frame supporting legs coupled between the display main body and the base to support the display main body; the frame supporting legs further extend downward and away from each other in a triangular shape toward the base and tilt forward from a rear portion of the base toward the guide frame;
  a tilting unit provided between the display main body and the base to allow the display main body to be tilted with respect to a horizontal axis of the base, the tilting unit including a tilting angle restrictor to restrict a tilting angle of the display main body; and
  a pivoting unit provided between the display main body and the tilting unit to allow the display main body to be pivoted with respect to an axis perpendicular to the horizontal axis of the base, the pivoting unit including a pivoting angle restrictor to restrict a pivoting angle a pivoting bracket about the tilting unit.

22. The display apparatus according to claim 21, wherein each sliding portion has a convex shape to be in contact with the respective auxiliary guide portion, and each auxiliary guide portion has a concave shape to be in contact with a respective sliding portion.

23. The display apparatus according to claim 21, wherein the lifting unit further comprises a stopper configured to connect with the guide frame and the lifting member to hold the lifting member about the guide frame.

24. The display apparatus according to claim 21, further comprising:
  a first stopper coupling portion formed on the guide frame; and
  a second stopper coupling portion formed on the lifting member, such that a stopper is inserted into the first stopper coupling portion and the second stopper coupling portion to prevent the lifting member from moving about the guide frame.

25. A display apparatus comprising a display main body to display a picture and a base supporting the display main body about an installation surface, the display apparatus comprising:
  a guide frame which extends from the base in an upward direction to support the display main body;
  a rotating unit provided between the display main body and the guide frame to allow the display main body to be tilted and pivoted simultaneously with respect to the guide frame and the base; and
  a frame supporter connected between the base and the guide frame, the frame supporter having a pair of frame supporter legs which extend downward and away from each other in a triangular shape toward the base, and further the pair of frame supporter legs tilt forward from a rear portion of the base to the guide frame to stabilize the display main body from tipping backwards, and
  wherein the rotating unit comprises a tilting unit provided between the display main body and the base to allow the display main body to be tilted with respect to a horizontal axis of the base, the tilting unit including a tilting angle restrictor to restrict a tilting angle of the display main body, and a pivoting unit provided between the display main body and the tilting unit to allow the display main body to be pivoted with respect to an axis perpendicular to the horizontal axis of the base, the pivoting unit including a pivoting angle restrictor to restrict a pivoting angle of a pivoting bracket about the tilting unit.

26. The display apparatus of claim 25, wherein an upper end of the frame supporter is connected to the guide frame, and the pair of frame supporter legs extend toward rear portions of the base to be connected to respective rear portions of the base.

27. The display apparatus of claim 26, wherein front portions of the pair of frame supporter legs has a distance therebetween which Is greater than a distance between rear portions of the pair of frame supporter legs such that the pair of frame supporter legs each extend forward and upward as they incline away from the respective rear portions of the base.

28. The display apparatus of claim 27, further comprising a cover member formed in an upside down Y-shape to cover the guide frame and the pair of frame supporter legs to provide additional stability to the guide frame and frame supporter.

29. A display apparatus having a display main body displaying a picture and a base to support the display main body about an installation surface, the display apparatus comprising:

a guide frame connected to the display main body and configured to support the display main body in an upright position; and a frame supporter having first and second frame supporter legs spaced apart from each other at lower ends thereof and connected to respective rear portions of the base, the first and second frame supporter legs extend upward and forward from the rear portions of the base to converge with each other at upper ends thereof and to form a triangular shape, the frame supporter being connected to the guide frame at a point of convergence of the first and second frame supporter legs, wherein the first and second frame supporter legs tilt forward from the rear portions of the base to the guide frame to stabilize the display main body from tipping backwards.

* * * * *